March 2, 1965 G. JESSE 3,171,287
MECHANISM FOR THE STROKE-CONTROL OF RECIPROCATING
MEMBERS, PARTICULARLY IN PROPORTIONING PUMPS
Filed June 19, 1962 3 Sheets-Sheet 1

Inventor:
GERHARD JESSE
By:
McGlew and Toren
Attorneys

Inventor:
GERHARD JESSE
By:
McGlew and Toren
Attorneys

March 2, 1965 G. JESSE 3,171,287
MECHANISM FOR THE STROKE-CONTROL OF RECIPROCATING
MEMBERS, PARTICULARLY IN PROPORTIONING PUMPS
Filed June 19, 1962 3 Sheets-Sheet 3

Inventor:
GERHARD JESSE
By:
McGlew and Toren
Attorneys

United States Patent Office 3,171,287
Patented Mar. 2, 1965

3,171,287
MECHANISM FOR THE STROKE-CONTROL OF RECIPROCATING MEMBERS, PARTICULARLY IN PROPORTIONING PUMPS
Gerhard Jesse, 1 Montah Ave., Killara, New South Wales, Australia
Filed June 19, 1962, Ser. No. 203,612
Claims priority, application Australia, June 20, 1961, 6,018/61
18 Claims. (Cl. 74—44)

This invention has reference to mechanism for use with an apparatus, machine or other device including a driven reciprocating member or members, said mechanism serving for optionally and continuously controlling or varying the amplitude of the reciprocating motion of said driven member or members.

More particularly the invention relates to means which permit optional adjustment of the magnitude of the stroke of a piston or plunger of a pump or other reciprocable device to suit different requirements of use.

In a specific arrangement the mechanism serves the purpose of adjusting the stroke of two such pistons, plungers or the like for joint operation, independently of one another.

It is one object of the invention to provide an improved mechanism of the type above referred to, which is simple in construction and reliable in operation.

Another object of the invention is to provide a mechanism of the type referred to, which permits stroke adjustment to be effected easily by the actuation of a single stationary element for each independently operable piston, plunger or other member.

The invention is particularly suitable for use in conjunction with so-called proportioning pumps, i.e. systems including two or more than two pumps for conveying predetermined quantities per unit of time, of different liquids or fluids, the ratio of the liquid or fluid delivery of the various pumps being continuously and independently adjustable to suit different requirements.

According to the invention the mechanism for controlling the reciprocating movement of at least one such driven member includes a cylindrical guide, a cylindrical bush for connection to said driven member said bush being provided with two cam slots disposed in opposite wall portions thereof and being both rotatable and axially displaceable within said guide, a connecting member one end of which is operatively connected to a drive whereas its opposite end is provided with mutually aligned gudgeon pins which slidingly engage each into one of said cam slots, and means adapted to constrain, selectively, the rotation and/or the axial displacement of the said bush within its guide for optionally varying the amplitude of the reciprocating movement imparted to the said bush and to said driven member from said drive by said connecting member.

The means for constraining the rotation and/or the axial displacement of the said bush—or of each bush, if the mechanism is designed for operating two or more driven members at the same time—may include a circular disc for each bush said disc being provided with a diametrical slot or groove, a protuberance from the side of said bush—or each said bush—for instance a pin, which slidingly engages in the diametrical slot or groove of the disc associated with said bush, and means for selectively adjusting the said disc, or each said disc, by turning it about its axis. The latter means may include a spindle and suitable gearing for the transmission of the spindle rotation to the said disc. The actuation of the spindle may be effected either manually, or mechanically from an optional control device.

If the aforementioned drive is a rotary drive, it includes a crankshaft and a crankpin or eccentric. The connecting member then consists of a connecting rod one end of which is operatively connected to said crankpin or eccentric whereas its opposite end is provided with the said gudgeon pins for engagement into the cam slots of the bush.

When used for the operation of proportioning pumps intended for instance for the mixing of more than two different liquids or fluids, the mechanism may be so designed that two or more than two drive units can be assembled in such a manner that all pumps can be driven from a single driving shaft the arrangement being such that, nevertheless, the stroke of each pump can be adjusted independently of that of the other pumps.

In order to more fully described the invention reference is made to the accompanying drawings which, by way of example only, illustrate two specific embodiments of the control device as applied to a proportioning pump. In these drawings.

Figure 1:
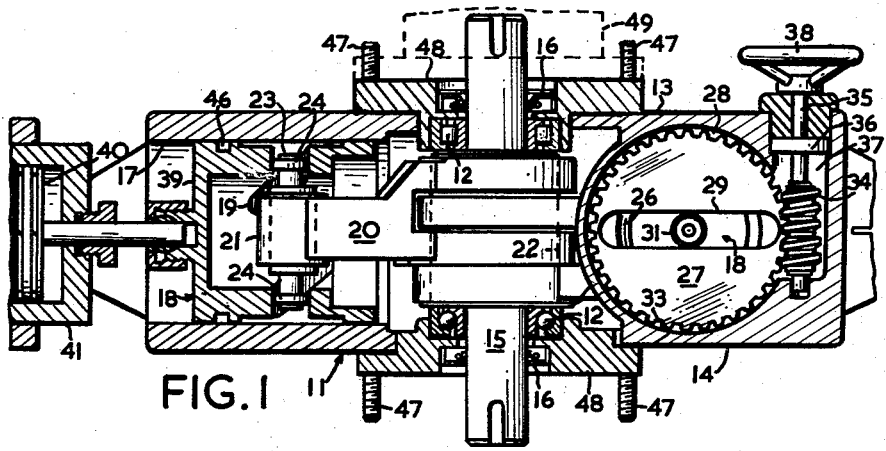
FIG. 1 is a side elevation of an arrangement including two units for use with two proportioning pumps, one unit being shown in section.

In the embodiments illustrated in FIGS. 1 to 3 and FIG. 4, respectively, the drive for the proportioning device comprises an elongated housing 11 of substantially box-like configuration provided mid-length with bearings 12, the said bearings being arranged near the opposite sides 13, 14 of the housing 11. The bearings 12 support a crankshaft 15 which projects from both sides of the housing 11 through oil seals 16.

Figure 2:
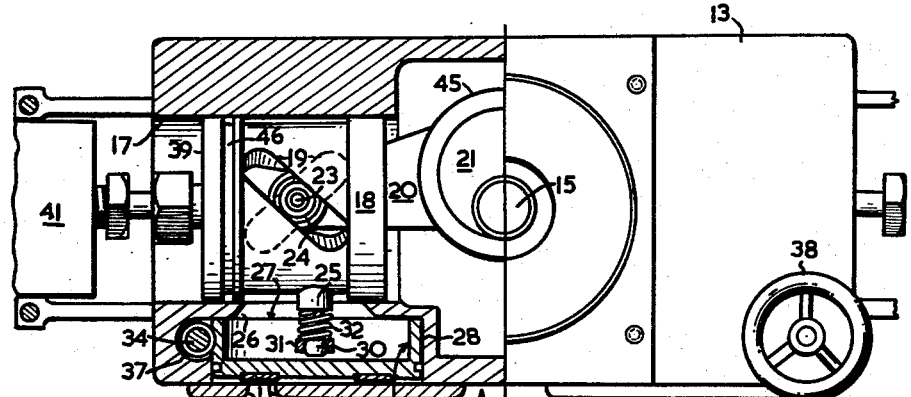
FIG. 2 is a plan view of the arrangement shown in FIG. 1, with one unit shown in section.
Figures 3, 4:
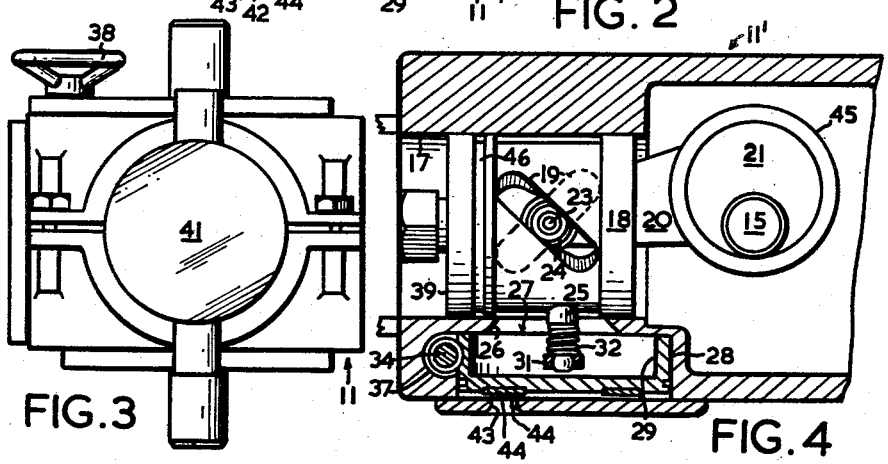
FIG. 3 is an end elevation of the arrangement shown in FIGS. 1 and 2.
FIG. 4 is a sectional plan view of an arrangement including a single unit only.

In the form shown in FIGS. 1 to 3 the housing 11 is provided with two cylindrical bores 17 arranged in mutual alignment at either side of the crankshaft 15.

As distinct therefrom FIG. 4 shows a casing 11', having a single bore 17 and designed for a single unit only.

A bush 18 is slidably and rotatably supported in each bore 17 and in the embodiment shown each bush is provided in its wall with a pair of helical cam slots 19. The longitudinal axes of the two helical slots 19 which, of course, are angularly inclined to any generatrix of the cylindrical surface of the bush 18, are so mutually arranged that analogous portions of these slots are diametrically opposite to each other in the said wall. Therefore, the two slots 19 seem to cross one another when the bush is viewed sidewise, as for instance in FIG. 2.

Figure 5:
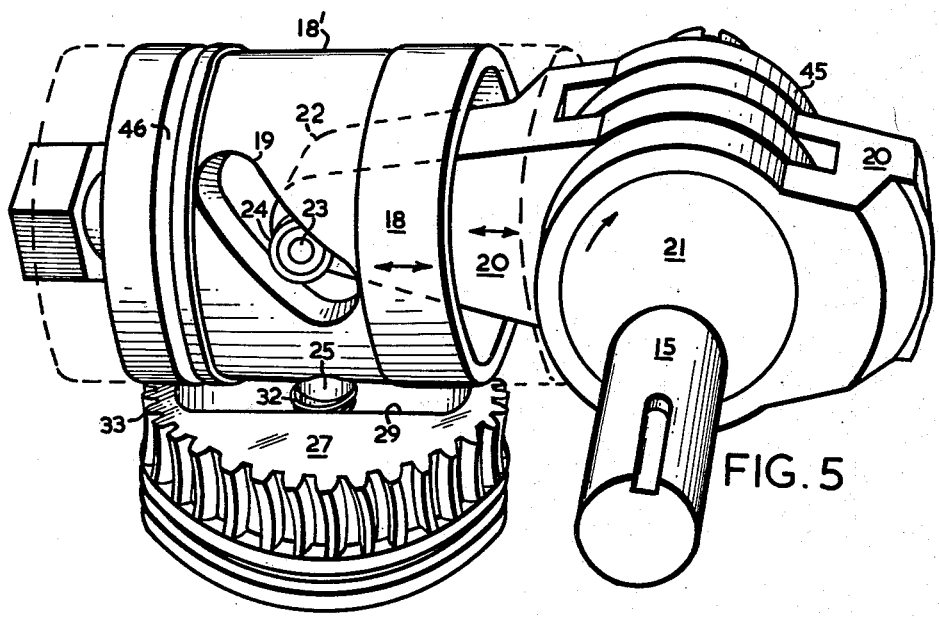
FIG. 5 is a perspective view on larger scale of the crankshaft, connecting rod and associated bush, and of a stroke-governing disc, the disc being in the position for maximum stroke.
Figure 6:
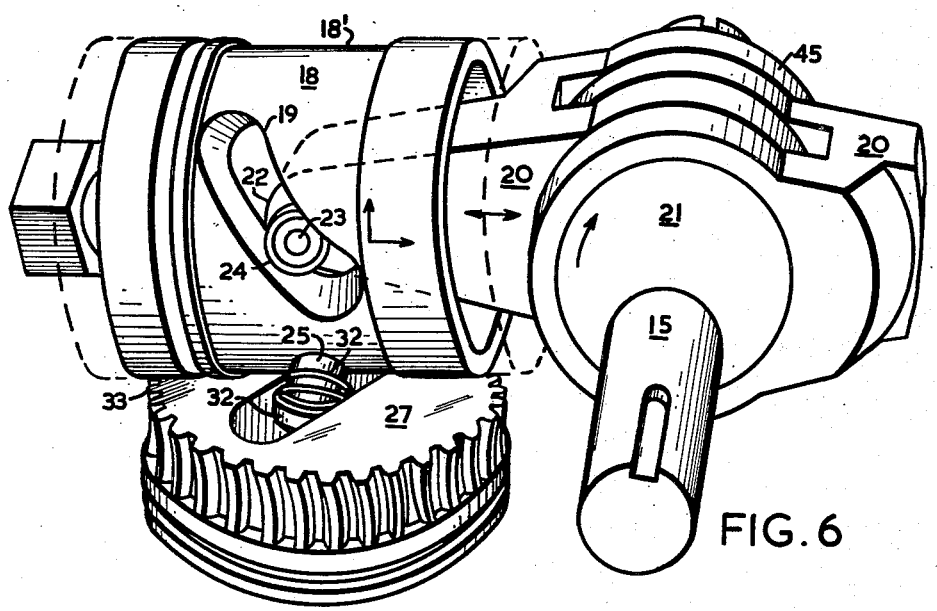
FIGS. 6 and 7 are views similar to FIG. 5 with the said disc in a position for a reduced stroke and for zero stroke, respectively.
Figure 7:
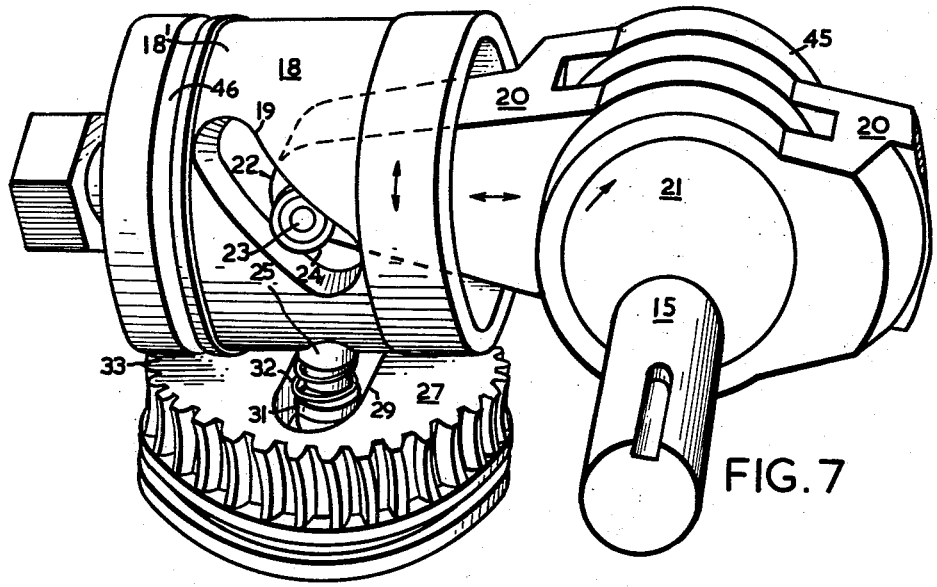

The cylindrical wall of the bush 18 is recessed between its opposite ends, as shown at 18' in FIGS. 5, 6 and 7, in order to reduce as far as possible the friction between the bush 18 and the inner wall of the bore 17.

Two connecting rods 20 are journalled to an eccentric 21 on the crankshaft 15, the two rods projecting each into one of the bores 17. The small end 22 of one connecting rod 20 extends into the hollow interior of one of the bushes 18, and the small end of the other connecting rod 20 projects into the interior of the second bush 18. Two gudgeon pins 23 secured in mutual alignment in each of the said small ends 22 slidingly engage in the opposite cam slots 19 of the respective bush 18. Rollers 24 are preferably mounted on the free ends of the gudgeon pins 23 for reducing losses resulting from the frictional engagement of the pins 23 in the slots 19.

A pin 25 projects radially from the outer surface of each bush 18 between the two slots 19, the pin 25 passing through an aperture 26 (FIGS. 2 and 4) in the wall of the bore 17. A circular disc 27, hereafter termed the stroke-governing disc, is rotatably mounted in a cylindrical cavity 28 formed in the housing 11, adjacent to the aperture 26, and an elongated diametrical groove or slot 29 is formed in said disc 27, the groove or slot facing the aperture 26. The pin 25 enters the groove or slot 29 and the free end 30 of the pin 25 which is spherical (FIG. 2) carries a roller 31 which is rotatably mounted thereon, a spring, for instance a coiled spring 32 on the pin 25, tending to keep the roller 31 normally in a plane perpendicular to the axis of the pin 25. The spherical end of the pin 25 and the spring 32 give universal orientation to the roller 31 to a limited extent. Thus the roller 31 can change its position on the spherical end of the pin 25 in such a manner that it can engage the opposite walls of the slot or groove 29 even though the bush 18 be turned about its longitudinal axis irrespective of the position of the groove or slot 29 of the disc 27.

The circumference of the stroke-governing disc 27 is provided with gear teeth 33 so that it may be operatively engaged by a worm 34 on a spindle 35 which is supported by bearings 36 within a chamber 37 (FIG. 1) of the housing and can be rotated from outside the housing 11 by means of a hand wheel 38.

Figures 9, 10, 11:
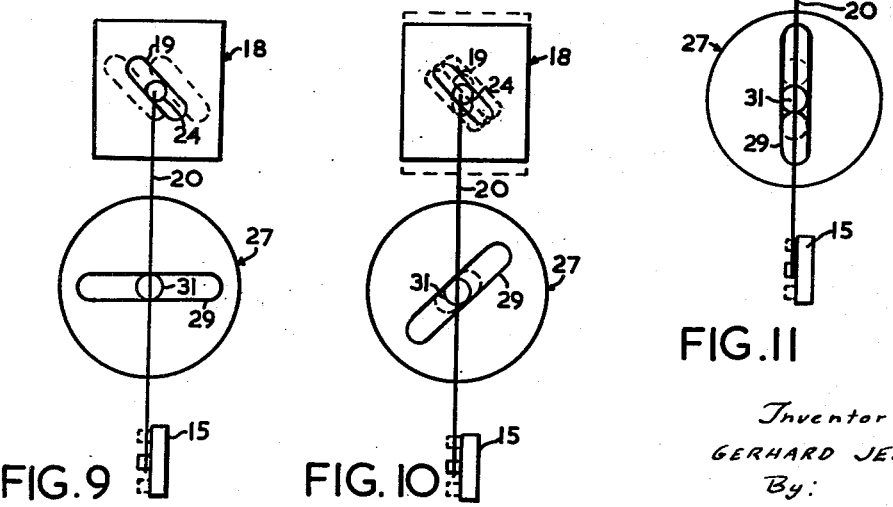
FIGS. 9 to 11 are diagrammatic representations showing the disposition of the moving parts of the drive for zero stroke, for reduced stroke and for maximum stroke, respectively.

The action of the stroke-governing mechanism is as follows:

If zero stroke is required, i.e. if a pump connected to a connecting rod 20 is to remain inoperative, the hand wheel 38 is turned so that the disc 27 is orientated with the longitudinal axis of its slot 29 to extend at right angles to the axis of the bush 18 as shown in FIGS. 7 and 9. If now the crankshaft 15 is rotated, the pin 25 will be prevented from displacement in the direction of the bush axis by the walls of the slot 29. Therefore the bush 18 also is prevented from axial displacement. However the interaction of the slots 19 with the rollers 24 on the gudgeon pins 23 will cause the bush to oscillate angularly about its longitudinal axis.

If the disc 27 is rotated through 90°, so that the slot 29 is in the position shown in FIG. 5, in which it extends parallel to the longitudinal axis of a bush, the pin 25 will now prevent angular oscillation of the bush 18 about its longitudinal axis. The movement of the crankshaft 15 will now be translated into maximum axial displacement of the bush 18.

In intermediate positions of the disc 27 and its slot 29, for instance if the slot 29 makes an angle of 45° with the axis of the bush 18 as shown in FIG. 6, both axial and angular displacement will be imparted to the bush 18 by the connecting rod 20. In this case the pin 25 will be displaced along the slot or groove 29 and will at the same time follow the rotation of the bush 18 and, consequently, the bush 18 will be axially displaced to a reduced amplitude as compared with conditions shown in FIG. 5.

The amplitude of the axial displacement of the bush can thus be controlled continuously from zero to a maximum determined by the throw of the eccentric 21, by changing the position of the disc 27 and of its slot 29.

It will be seen that the angle between the axis of the pin 25 and the median plane of the slot 29 will vary during the operation of the mechanism, except in the disc adjustment for maximum or zero stroke. The peripheral face of the roller 31 on the spherical end 30 of the pin, however, is kept permanently in engagement with the walls of the slot 29 by the action of the spring 32.

The two bushes 18 are each coupled at its closed end 39 to the piston 40 of a positive displacement pump unit 41 of a proportioning pump. Hence the pump output for each stroke can be accurately controlled by the rotation of the hand wheel 38, and any desired proportioning of the pump output be obtained by the independent adjustment of the two hand wheels 38.

For adequately determining the amplitude of the stroke of each bush 18 and piston 40 a suitable gauge is associated with each stroke-governing disc 27. In a particularly convenient arrangement a segment-shaped scale 42 bearing the proper graduation is provided on each disc 27, and a segment-shaped window 43 provided in the outer wall of the housing 11. Through the window 43 the graduation of the scale 42 can be read against a marking 44 on the outer wall of the housing, next to the window 43.

In the preferred embodiment illustrated in FIGS. 1 to 3 the big ends 45 of the connecting rods 20 are bifurcated, as will best be seen from FIGS. 5 to 7. Thereby the assembly of the mechanism is facilitated, as it makes it possible, firstly, to place the bushes 18 and the connecting rods 20 in position within the bores 17 with the fork-shaped big ends interengaged, then to align the big ends 45, and thereafter to insert the crankshaft 15 with the eccentric 21 whereupon the chamber accommodating the crankshaft is sealed off with the bearings 12 and oil seals 16 at the opposite sides of the housing 11.

The chamber of the housing 11 accommodating the shaft 15, and the bores 17 which act as guides for the bushes 18 are preferably filled with oil. Circumferential grooves 46 for O-rings are provided in the end portions of the bushes 18 adjacent to the closed end walls 39 of the latter.

Pins 47 stand up from the end plates 48 which accommodate the bearings 12 and oil seals 16. These pins 47 permit the mounting of another drive mechanism either at one side only or at both sides of a first drive mechanism, by coupling the shafts 15 of the mechanisms, for instance inside a mounting ring 49 such as shown in dotted lines in FIG. 1. By coupling two, or more than two, such mechanisms in the manner described above it is possible to operate the pump units of a proportioning pump system including any required number of pumps from a common drive, the arrangement permitting the independent adjustment of the stroke of any unit in the system.

Figure 8:
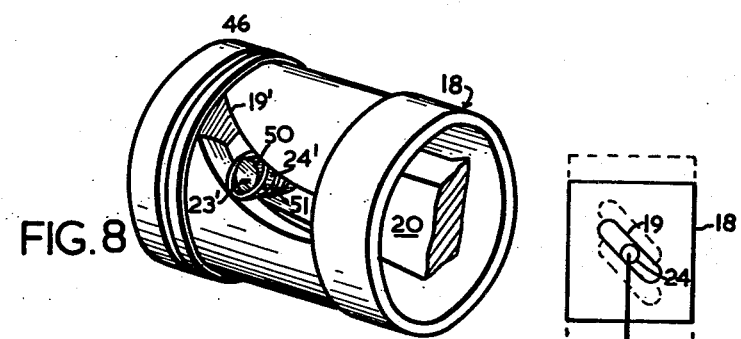
FIG. 8 illustrates a variant in the construction of the bush and connecting rod forming part of the adjustable drive.

In the variant illustrated in FIG. 8 the cam slots 19' in the bush 18 are produced by milling the same into opposite wall portions of the bush with a milling cutter operating in a plane which angularly intersects the longitudinal axis of the bush. The slots 19' so produced are not helical and therefore it is necessary in this case to provide each of the gudgeon pins 23' in the small end 22 of the connecting rod 20 with a spherical end 50 and to place on said spherical end an annular roller 24'. A spring, for instance a coil spring 51, is provided on the pin 23' by the action of which the roller 24' is kept permanently in operative engagement with the walls of the cam slot 19', irrespective of the adjustment of the device and of the momentary position of the gudgeon pin within the said slot.

I desire it to be understood that I do not wish protection by Letters Patent to be limited to the aforedescribed details as these are capable of modification in various ways within the scope of the appended claims.

Thus for instance it will be appreciated that in an arrangement such as described with reference to FIGS. 1 to 3, the bores guiding the bushes need not necessarily be arranged in axial alignment, but may be set at an optional angle to each other. It will also be understood that it would be possible to provide the control mechanism with more than two guides, bushes and connecting rods for operation from one crankpin or eccentric.

The eccentric may be replaced by a crankpin carried by transverse crank webs of the crankshaft in a manner similar to crankshafts used in various types of engines.

In the example described the stroke adjustment is effected manually by means of hand wheels. It is possible, however, if so desired, to effect the adjustment of the stroke-governing disc or discs mechanically, electro-mechanically, hydraulically or otherwise from any suitable control device.

The stroke-governing discs as described represent a most convenient form of stroke control, but if so desired the discs may be replaced by adjusting elements or different shape and/or design.

For controlling the reciprocating movement of a driven member to which this movement is imparted from a reciprocating drive the rotational and/or axial displacement of the bush forming part of the mechanism and provided with cam slots may be effected by a connecting member other than a connecting rod, said connecting member being likewise provided with gudgeon pins or equivalent engaging in the cam slots of the said bush.

What I claim is:

1. A mechanism for use with a machine or other device having at least one driven reciprocating member, for optionally and continuously varying the amplitude of the reciprocating motion of said driven member, said mechanism comprising a cylindrical guide, a cylindrical bush for connection to said driven member, said bush being both rotatable and axially displaceable within said guide and having two cam slots in opposite wall portions thereof, a connecting member having two ends, one of which is operatively connected to a drive, mutually aligned gudgeon pins in the other end of said connecting member, said pins slidingly engaging each into one of said cam slots, and adjustable cam means operatively associated with said bush and controlling the rotational displacement of the said bush within its guide for optionally varying the amplitude of the reciprocating movement imparted to the said bush and to said driven member from said drive by said connecting member.

2. A mechanism as claimed in claim 1, wherein the said drive is a rotary drive and includes a crankshaft and a crankpin, and wherein the said connecting member is a connecting rod, one end of which is operatively connected to the said crankpin, whereas its opposite end is provided with the said gudgeon pins.

3. A mechanism as claimed in claim 1, wherein the said drive is a rotary drive and includes a crankshaft and an eccentric on said crankshaft, and wherein the said connecting member is a connecting rod, one end of which is operatively connected to said eccentric, whereas its opposite end is provided with the said gudgeon pins.

4. A mechanism as claimed in claim 1, wherein the said drive is a rotary drive and includes a crankshaft and a crankpin, and wherein the said connecting member is a connecting rod, one end of which is operatively connected to the said crankpin, whereas its opposite end is provided with the said gudgeon pins, the mechanism being accommodated within a housing and the said cylindrical guide being constituted by a cylindrical bore in said housing, the longitudinal axis of which is perpendicular to the axis of said crankshaft.

5. A mechanism as claimed in claim 1, wherein the said drive is a rotary drive and includes a crankshaft and an eccentric on said crankshaft, and wherein the said connecting member is a connecting rod, one end of which is operatively connected to said eccentric, whereas its opposite end is provided with the said gudgeon pins, the mechanism being accommodated within a housing and the said cylindrical guide being constituted by a cylindrical bore in said housing, the longitudinal axis of which is perpendicular to the axis of said crankshaft.

6. A mechanism for use with a machine or other device having two driven reciprocating members, for optionally and continuously varying the amplitude of the reciprocating motion of said driven members, said mechanism comprising two cylindrical guides, two cylindrical bushes each for connection to one of said driven members, said bushes being both rotatable and axially displaceable each within one of said guides and having each two cam slots in opposite wall portions thereof, a crankshaft, two connecting rods each having two ends, one of which is operatively connected to said crankshaft, pins in the other end of each said connecting rod, said pins slidingly engaging into the cam slots of one of said bushes, and independently adjustable cam means each operatively associated with a respective bush and controlling the rotational displacement of the associated bush within its guide, for optionally varying the amplitude of the reciprocating movement imparted to the said bushes and to said driven members from said crankshaft by said connecting rods.

7. A mechanism as claimed in claim 6 accommodated within a housing, wherein the said cylindrical guides are each constituted by a cylindrical bore in said housing, the longitudinal axis of which is perpendicular to the axis of said crankshaft.

8. A mechanism as claimed in claim 6, wherein the end, operatively connected with said crankshaft, of at least one of said connecting rods is fork-shaped.

9. A mechanism as claimed in claim 6 accommodated within a housing, wherein the said cylindrical guides are each constituted by a cylindrical bore in said housing, the longitudinal axis of which is perpendicular to the axis of said crankshaft, and wherein the end, operatively connected with said crankshaft, of at least one of said connecting rods is fork-shaped.

10. A mechanism as claimed in claim 1, wherein said adjustable cam means controlling rotational displacement of the said bush within its cylindrical guide includes a circular disc provided with a diametrical guide formation, a proturberance from the side of said bush, said protuberance slidingly engaging into the diametrical guide of said disc, and adjusting means operatively associated with said disk for selectively adjusting the said disc by turning it about its axis.

11. A mechanism as claimed in claim 6, wherein the said adjustable cam means controlling the rotational displacement of the said bushes each within its cylindrical guide include two circular discs, each provided with a diametrical guide formation, a protuberance from the side of each said bush, the protuberance from one of said bushes slidingly engaging into the diametrical guide formation of one of said discs and the protuberance from the other bush slidingly engaging into the diametrical guide formation of the other disc, and respective adjusting means each operatively associated with a respective disk, for independently adjusting the said discs by turning same, selectively, each about its axis.

12. A mechanism as claimed in claim 1, wherein the adjustable cam means controlling the rotational displacement of the said bush within its cylindrical guide includes a circular disc provided with a diametrical guide formation, a protuberance from the side of said bush, said protuberance slidingly engaging into the diametrical guide formation of said disc, a gear on said disc, a spindle and a pinion on said spindle, the said spindle, the pinion and the said gear serving for selectively adjusting said disc about its axis.

13. A mechanism as claimed in claim 6, wherein the said adjustable cam means controlling the rotational displacement of the said bushes each within its guide include two circular discs, each provided with a diametrical groove, a protuberance from the side of each said bush, the protuberance from one of said bushes slidingly engaging into the diametrical groove of one of said discs and the protuberance from the other bush slidingly engaging into the diametrical groove of the other disc, a gear on each said disc, two spindles, and a worm on each said spindle, the worm on one of said spindles being in mesh with the gear on one of said discs, and the worm on the other spindle being in mesh with the gear on the other disc, the said spindles serving for selectively and independently adjusting the said discs each about its axis.

14. A mechanism as claimed in claim 1, wherein the adjustable cam means controlling the rotational displacement of the said bush within its guide includes, a circular disc provided with a diametrical groove, a protuberance from the side of said bush, said protuberance slidingly engaging into the diametrical groove of said disc and being provided with a spherical end portion and with a roller capable of self-adjustment about said spherical end portion, and adjusting means operatively associated with said disc for selectively adjusting the said disc by turning it about its axis.

15. A mechanism as claimed in claim 6, wherein the said adjustable cam means controlling the rotational displacement of the said bushes each within its guide includes two circular discs, each provided with a diametrical groove, a protuberance from the side of each said bush, the protuberance from one of said bushes slidingly engaging into the diametrical groove of one of said discs and the protuberance from the other bush slidingly engaging into the diametrical groove of the other disc, respective adjusting means each operatively associated with a respective disc for independently adjusting the said discs by turning same, selectively, each about its axis, each said protuberance being provided with a spherical end portion and with a spring-loaded roller capable of self-adjustment about said spherical end portion.

16. A mechanism as claimed in claim 1, wherein the said cam slots are helical slots, analogous portions of the cam slots in the opposite wall portions of said bush being diametrically opposite to each other in the wall of said bush.

17. A mechanism as claimed in claim 6, wherein the cam slots in each of said bushes are helical slots, analogous portions of the cam slots in each said bush being diametrically opposite to each other in the wall of said bush.

18. A mechanism as claimed in claim 6 which includes a housing and wherein the said adjustable cam means controlling the rotational displacement of the said bushes each within its guide include two circular discs, each provided with a diametrical groove, a protuberance from the side of each said bush, the protuberance from one of said bushes slidingly engaging into the diametrical groove of one of said discs and the protuberance from the other bush slidingly engaging into the diametrical groove of the other discs, respective adjusting means each operatively associated with a respective disc for independently adjusting the said discs by turning same, selectively, each about its axis, a scale on each said disc, and a window in the said housing opposite each said disc, each said scale being provided with a graduation for measuring the amplitude of the bush stroke to which the respective disc is adjusted, and a marking on the said housing adjacent to each said window against which the respective scale graduation can be read.

References Cited by the Examiner
UNITED STATES PATENTS

| | | | |
|---|---|---|---|
| 956,462 | 4/10 | Windsor | 74—23 |
| 1,239,728 | 9/17 | Schleppy | 74—44 X |
| 2,615,398 | 10/52 | Howard | 74—44 X |

FOREIGN PATENTS

| | | |
|---|---|---|
| 458,464 | 4/28 | Germany. |
| 553,488 | 12/56 | Italy. |

BROUGHTON G. DURHAM, *Primary Examiner*.